Patented Dec. 9, 1941

2,265,909

UNITED STATES PATENT OFFICE 2,265,909

CYANINE TYPE DYESTUFFS

John David Kendall, Ilford, England, assignor to Ilford Limited, Ilford, Essex, England, a British company No Drawing. Application March 7, 1940, Serial No. 322,834. In Great Britain March 21, 1939

12 Claims. (Cl. 260—240)

The invention relates to the production and use of dyestuffs of value as sensitisers for photographic silver halide emulsions.

In my co-pending application Serial No. 322,835, filed March 7, 1940, I have described the manufacture of dyestuffs and intermediates containing a cyclopentadiene grouping and a single heterocyclic nitrogen nucleus by a process which consists in reacting, in the presence of a strong base, a compound containing the grouping

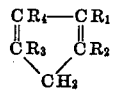

(where $R_1$, $R_2$, $R_3$ and $R_4$ are hydrogen or the hydrocarbon groupings of a cyclopentadiene homologue, or $R_1$ and $R_2$ may form part of an arylene residue as in indene) with a quaternary salt of a heterocylic nitrogen compound containing as a reactive group a thioether or selenoether group (including an aryl-, alkyl- or aralkyl-thioether or -selenoether group) or a $-(CH=CH)_n-NH_2$ group where $n$ is a positive integer (including N-acyl, N-aryl and N-acylaryl substituted groups of this type (in the $\alpha$ or $\gamma$ position to the quaternary nitrogen atom. The grouping $-(CH=CH)_nNH_2$ is hereinafter referred to as the aminovinyl type of group. The products obtained by this process are compounds of the following general Formula I:

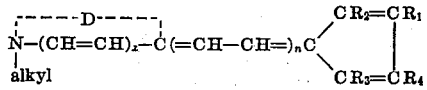

where D is the remainder of a heterocyclic ring and $R_1$, $R_2$, $R_3$ and $R_4$ have the meaning assigned to them above, $x$ is nought or 1, and $n$ is nought or a positive integer, e. g. 1, 2 or 3.

I have found that compounds of this general structure which contain a CH group in the 3 position of the cyclopentadiene grouping (i. e. where $R_1$ or $R_4$ in the above formula is hydrogen) are valuable intermediates for the production of symmetrical and unsymmetrical cyanine dyestuffs.

According to the present invention, therefore, dyestuffs are produced by condensing compounds of the following general Formula II:

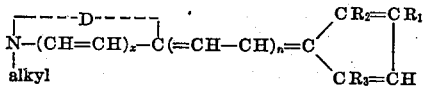

(where $R_1$, $R_2$ and $R_3$ are hydrogen or the hydrocarbon groupings of a cyclopentadiene homologue, or $R_1$ and $R_2$ are part of an arylene residue as in indene, $x$ is nought or 1 and $n$ is nought or a positive integer e. g. 1, 2 or 3 and D is the residue of a heterocyclic nitrogen compound of the type used in the production of cyanine dyes), with a quaternary salt of a heterocyclic nitrogen compound containing as a reactive group a halogen atom, a thioether or selenoether group (including an aryl-, alkyl- or aralkyl-thioether or -selenoether group) or a $-(CH=CH)_nNH_2$ group where $n$ is a positive integer (including N-acyl, N-aryl and N-acylaryl substituted groups of the type), in the $\alpha$ or $\gamma$ position to the quaternary nitrogen atom.

Compounds of the general Formula II which are used as intermediates in the process of the present invention, may be produced by the processes described in my co-pending application Serial No. 322,835, filed March 7, 1940, using a cyclopentadiene or indene compound which is unsubstituted in the 1 and 3-positions of the cyclopentadiene ring.

Any of the known types of heterocyclic quaternary ammonium compounds containing the specified reactive halogen, thio-ether, selenoether or amino-vinyl types of groups, commonly employed in the manufacture of cyanine dyestuffs may be employed in the present invention. Examples are substituted and unsubstituted thiazoles, thiazolines, oxazoles, oxazolines, selenazoles, selenazolines, pyridines, quinolines, indolenines and diazines (e. g. pyrimidines), thiodiazoles and quinazolines, including the corresponding substituted and unsubstituted polycyclic compounds such as benzthiazoles, naphthothiazoles and anthrathiazoles and also the diazoles described in British Patent Specification No. 425,609.

Where the quaternary salt employed contains a reactive halogen atom in the $\alpha$ or $\gamma$ position to the quaternary nitrogen atom, the reaction is preferably carried out in the presence of an acid binding agent, for example, pyridine, ethylamine, piperidine, alkali acetate or alkali carbonate. In other cases the reaction may be carried out in the absence of an acid binding agent, but in the presence of a solvent, for example, ethyl alcohol and acetic anhydride, in which the reactants are easily soluble under the conditions of the reaction. The reaction may be readily effected by heating the reactants together.

Instead of employing a quaternary ammonium salt of a heterocyclic nitrogen compound containing the necessary reactive group there may be employed the corresponding base together with an alkyl sulphate, alkyl paratoluene sulphonate or other salt which will convert the base to the necessary quaternary salt under the conditions of the reaction. Thus, a compound of the general Formula II given above may be mixed with a heterocyclic nitrogen base containing one of the reactive groups referred to above and with an alkyl paratoluene sulphonate or alkyl sulphate and the mixture fused. In this case the product obtained is a paratoluene sulphonate or alkyl sulphate and it may be converted to the corresponding alkyl halide by dissolving it in ethyl alcohol and adding an aqueous solution of an alkali halide.

The mechanism of the general reaction on which the present invention is based may be illustrated by the reaction between 1-methyl-1:2-dihydrobenzthiazolylidene indene and 1-ω-acetanilido-vinyl-1:3:3-trimethyl-indolenium iodide, thus:

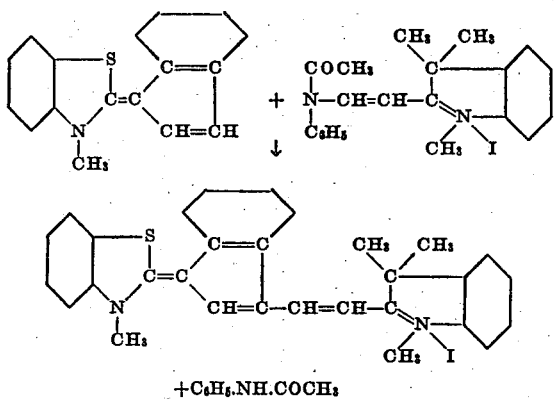

+C₆H₅.NH.COCH₃

The process of the invention is illustrated by the following specific examples:

*Example I*

0.61 gm. of 1-methylthiolbenzthiazole and 0.62 gm. of methyl-p-toluene sulphonate were mixed together and heated for two hours at 130-140° C. 0.48 gm. of 1-ω-N-methyldihydrobenzthiazolylidene ethylidene indene and 5 ccs. of pyridine were then added and the mixture warmed on a water bath until all the solids dissolved. The mixture was then refluxed gently for twenty minutes during which time a blue colour developed. The mixture was then poured into a solution of potassium bromide when the dyestuff precipitated out. The precipitate was removed by filtration and washed with ethyl alcohol and ether. It was then boiled with 60 ccs. of methyl alcohol and the crystalline dyestuff recovered therefrom. The product consisted of blue needles having a melting point of 215° C.

This dyestuff incorporated in a silver chloride emulsion imparts a band of sensitivity between 6000-7000 Å. Incorporated in a silver bromide emulsion it imparts extra sensitivity at about 6500 Å.

*Example II*

4.46 gms. of 2-ω-acetanilidovinyl-1:3:3-trimethylindolenium iodide, 4 ccs. of indene, 10 ccs. of pyridine and 4 ccs. of diethylamine were mixed together and boiled under a reflux condenser for one hour. The excess pyridine was removed by distillation in vacuum and the solid quaternary salt prepared by reacting 3.62 gms. of 1-methylthiolbenzthiazole and 3.72 gms. of methyl-p-toluene sulphonate was added to the residue, and then 20 ccs. of alcohol were added.

The mixture was refluxed for one hour and poured into a potassium iodide solution. The precipitate was filtered off, washed with ethyl alcohol and ether and recrystallized from 30 ccs. of methyl alcohol. The product consisted of dark green needles, melting at 219° C. with decomposition.

This dyestuff incorporated in a silver chloride emulsion imparts a band of sensitivity between 5600-7000 Å.

*Example III*

The dyestuff produced as set forth in Example II may also be produced by the following method:

1.81 gms. of 1-methylthiobenzthiazole and 1.86 gms. of methyl-p-toluene sulphonate were mixed together and heated in an oil bath at 130-140° C. for 2½ hours. The mixture was cooled and there was added 1 cc. of indene, 3 ccs. of diethylamine and 15 ccs. of pyridine. This mixture was heated on a water bath for five minutes and then refluxed for two hours, during which a yellow-brown colour developed. The mixture was then poured into a warm solution of 3 gms. of potassium iodide and in 10 ccs. of water. Benzene was added and the mixture filtered. The benzene layer was then separated, the benzene distilled off and the residue warmed under vacuum to remove indene and pyridine. The residue was then extracted with ether, the ether solution decanted and the ether removed by distillation. To the residue was then added 2.23 gms. of 1:3:3-trimethyl-2-ω-acetanilidovinyl indolenium iodide and 20 ccs. of acetic anhydride. The mixture was heated for five minutes on a water bath and then gently refluxed for 15 minutes. The yellowish-red solution turned intense blue in colour. The solution was cooled, filtered and the residue was washed with acetic anhydride, benzene, alcohol and finally ether. The recrystallised product had a melting point of 222° C.

*Example IV*

0.83 gm. of 1-methylthiol-benzoxazole, 0.93 gm. of methyl-p-toluene sulphonate and 0.72 gm. of 1 - ω -(N-methyldihydrobenzthiazolylidene) - ethylidene indene were mixed together and fused at 130-140° C. for two-and-a-half hours. During this treatment a blue colour developed and solid separated. 5 ccs. of pyridine were added and the mixture heated on a water bath for ten minutes and then gently refluxed for ten minutes. The mixture was cooled and the solid matter removed by filtration. The solid matter was washed with ethyl alcohol and ether and consisted of a dyestuff having a melting point of 308° C.

This dyestuff incorporated in a silver chloride emulsion imparts a band of sensitivity between 5600-6800 Å.

*Example V*

0.88 gm. of 1-ω-acetanilidovinyl-benzoxazole methiodide, 0.48 gm. of 1-ω-(N-methyl dihydrobenzthiazolylidene)-ethylidene indene and 15 ccs. of acetic anhydride were mixed together and heated on a water bath for five minutes and then boiled for five minutes. The dyestuff precipitated from the hot solution. The solution was then cooled and the dyestuff separated by filtration. The dyestuff was washed with acetic anhydride, hot benzene, ethyl alcohol and ether, and boiled with 20 ccs. of benzene, filtered hot and again washed with hot benzene, ethyl alcohol and ether. The product consisted of bronze matted crystals, melting at 291° C. with decomposition.

This dyestuff incorporated in a silver bromide emulsion imparts a band of sensitivity between 7000-7800 Å.

*Example VI*

0.9 gm. of 1-acetanilidovinyl-benzoxazole ethiodide, 0.48 gm. of 1-ω-(N-methyldihydrobenzthiazolylidene)-ethylidene indene and 15 ccs. of acetic anhydride were mixed together and gently refluxed for ten minutes. The solution was then cooled and the solid dyestuff formed was removed by filtration. The dyestuff was then washed with acetic anhydride, hot benzene, warm ethyl alcohol and ether. It consisted of bronze crystals melting at 293° C. with decomposition.

This dyestuff incorporated in a silver bromide emulsion imparts a band of sensitivity between 6900–7800 Å with a maximum at about 7500–7600 Å.

Example VII 1.13 gm. of 1-ω-acetanilidovinyl-benzthiazole ethiodide, and 0.72 gm. of 1-ω-(N-methyldihydrobenzthiazolylidene-ethylidene indene were mixed together and finely ground. The finely ground mixture was then heated with 30 ccs. of acetic anhydride for five minutes on a water bath and the mixture then gently refluxed for ten minutes. The dyestuff precipitated from the hot solution and was removed by filtration, washed with acetic anhydride, hot benzene ethyl alcohol and ether. It consisted of dark bronze crystals melting at 229° C. with decomposition.

This dyestuff incorporated in a silver bromide emulsion imparts a band of sensitivity between 6800–8400 Å with a maximum at about 7600 Å.

Example VIII 0.61 gm. of 2-ω-acetanilidovinyl-1:3:3-trimethyl-indolenium iodide (finely ground), 0.36 gm. of 1-ω-(N-methyldihydrobenzthiazolylidene)-ethylidene indene and 20 ccs. of acetic anhydride were mixed together and heated on a water bath for two minutes. The mixture was then heated over a flame for five minutes until it just boiled and was allowed to boil for a short period. The dyestuff precipitated out for the hot solution. The solution was cooled and the dyestuff removed by filtration. The dyestuff was then washed with acetic anhydride, hot benzene, ethyl alcohol and ether and consisted of dark bronze crystals melting at 271 C. with decomposition.

Example IX 1.8 gm. of 1-methylthiol-benzthiazole and 1.86 gm. of methyl-p-toluene sulphonate were mixed together and heated for three-and-a-half hours at 130° C. 1 cc. of indene, 3 ccs. of diethylamine and 15 ccs. of pyridine were then added to the mixture. The mixture was heated under reflux for two hours during which period a yellow-brown colour developed. The mixture was poured into 30 ccs. of a 16% potassium iodide solution. Benzene was added and the solution filtered. The benzene layer was separated and the aqueous layer extracted twice with benzene. The benzene layer and benzene extracts were the mixed together and dried over anhydrous potassium carbonate. The benzene was then removed by distillation and the residue heated in vacuum to remove pyridine and indene.

The residue, which was of an oily character, was then extracted with ether, and the ether extract dried over potassium carbonate. The ether was then removed by evaporation and 2.23 gm. of 2-ω-acetanilidovinyl-1:3:3-trimethyl indolenium iodide and 20 ccs. of acetic anhydride added to the residue.

The mixture was warmed on a water bath for five minutes and then heated for a quarter-of-an-hour over a flame. During this treatment an intense blue colour developed. The mixture was then transferred to a beaker and cooled. The solid matter was separated by filtration and washed with acetic anhydride, hot benzene, ethyl alcohol, ether and warm water. The solid matter was then recrystallised from methyl alcohol yielding a dyestuff having a melting point of 208° C.

Example X 3.62 gm. of 1-methyl-thiolbenzthiazole and 3.72 gm. of methyl-p-toluene sulphonate were mixed together and heated in an oil bath for three hours at 130° C. 2 ccs. of indene, 8 ccs. of diethylamine and 30 ccs. of pyridine were added to the cooled mixture and the mixture was then heated on a water bath for five minutes and then refluxed for two hours at 120° C. The solution was then poured into a solution of 4 gm. of potassium iodide and 15 ccs. of water. Benzene was added and the mixture filtered. The benzene layer was then separated, the aqueous layer was extracted with benzene and the benzene extracts were bulked together and dried over potassium carbonate. The solution was then filtered and the solvent removed. The residue was then dried in a vacuum desiccator.

1.15 gms. of 1-methyl thiol-α-naphthathiazole and 0.93 gm. of methyl-p-toluene sulphonate were mixed together and heated for three hours at 130–140° C. To the cooled product was added 1.14 gms. of the residue obtained according to the preceding paragraph dissolved in 15 ccs. of alcohol. The mixture was then heated on a water bath for one hour during which a reddish-yellow colour developed. The mixture was then poured into potassium bromide solution and after cooling, the product was separated by filtration and washed with alcohol, ether and hot benzene. The product was a reddish-brown solid having a melting point of 207° C. with decomposition.

Example XI 0.83 gm. of 1-methylthiolbenzoxazole and 0.93 gm. of methyl-p-toluene sulphonate were mixed together and heated for three hours at 130° C. The mixture was then cooled and to it there was added 1.4 gms. of the residue produced according to the first paragraph in Example X, dissolved in 15 ccs. of alcohol. The mixture was then heated on a water bath for one hour during which a yellowish-orange colour developed. The mixture was poured into potassium iodide solution whereupon an oil separated out. This oil was triturated with benzene, the benzene solution was decanted and the residue treated with hot alcohol. The solution was cooled, filtered, and the residue washed with alcohol and ether. The product was obtained as green crystals having a melting point of 213° C. with decomposition.

In the following claims the expressions "thioether group," "seleno-ether group" and "aminovinyl type of group" have been used for the sake of briefness, but it is to be understood that the first two of these expressions include the corresponding aryl-, alkyl-, and aralkyl- thio-ether and -seleno-ether groups and that the third expression includes groups of the formula

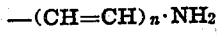

(where $n$ is a positive integer) and N-acyl, N-aryl and N-acylaryl substituted groups of this type.

I claim:

1. Process for the production of dyestuffs, which comprises condensing a compound of the general formula:

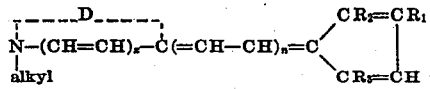

wherein $R_1$ and $R_2$ are selected from the group consisting of hydrogen atoms, hydrocarbon groups and the atoms necessary to complete an arylene radical with $-C'=C'-$, $R_3$ is selected from the group consisting of hydrogen atoms and hydrocarbon groups, X is selected from the group consisting of nought and 1, $n$ is selected from the group consisting of nought and positive integers, and D constitutes the atoms necessary to form a heterocyclic nitrogen compound of the type used in the production of cyanine dyes, with a quaternary salt of a heterocyclic nitrogen compound of the type used in the production of cyanine dyes containing in one of the $\alpha$ and $\gamma$ positions to the quaternary nitrogen atom a reactive group selected from the group consisting of the thioether group, the seleno ether group, the amino-vinyl type of group, and a halogen atom.

2. Process for the production of dyestuffs which comprises condensing a compound of the general formula:

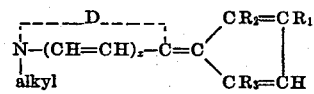

wherein $R_1$ and $R_2$ are selected from the group consisting of hydrogen atoms, hydrocarbon groups and the atoms necessary to complete an arylene radical with $-C'=C'-$, $R_3$ is selected

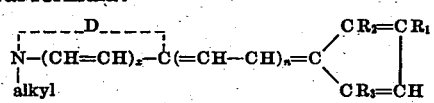

from the group consisting of hydrogen atoms and hydrocarbon groups, X is selected from the group consisting of nought and 1, and D constitutes the atoms necessary to form a heterocyclic nitrogen compound of the type used in the production of cyanine dyes, with a quaternary salt of a heterocyclic nitrogen compound of the type used in the production of cyanine dyes, but different from the heterocyclic nitrogen compound containing D, containing in one of the $\alpha$ and $\gamma$ positions to the quaternary nitrogen atom a reactive group selected from the group consisting of the thioether group, the seleno ether group, the amino-vinyl type of group and a halogen atom.

3. Process for the production of dyestuffs, which comprises condensing a compound of the general formula:

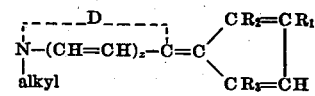

wherein $R_1$ and $R_2$ are selected from the group consisting of hydrogen atoms, hydrocarbon groups and the atoms necessary to complete an arylene radical with $-C'=C'-$, $R_3$ is selected from the group consisting of hydrogen atoms and hydrocarbon groups, $x$ is selected from the group consisting of nought and 1, $n$ is a positive integer and D constitutes the atoms necessary to form a heterocyclic nitrogen compound of the type used in the production of cyanine dyes, with a quaternary salt of a heterocyclic nitrogen compound of the type used in the production of cyanine dyes containing in one of the $\alpha$ and $\gamma$ positions to the quaternary nitrogen atom a reactive group selected from the group consisting of the thioether group the seleno ether group, the aminovinyl type of group, and a halogen atom.

4. Process for the production of dyestuffs, which comprises condensing a compound of the general formula:

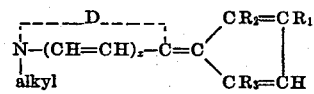

wherein $R_1$ and $R_2$ are selected from the group consisting of hydrogen atoms, hydrocarbon groups and the atoms necessary to complete an arylene radical with $-C'=C'-$, $R_3$ is selected from the group consisting of hydrogen atoms and hydrocarbon groups, $x$ is selected from the group consisting of nought and 1, and D constitutes the atoms necessary to form a heterocyclic nitrogen compound of the type used in the production of cyanine dyes, with a quaternary salt of a heterocyclic nitrogen compound of the type used in the production of cyanine dyes containing in one of the $\alpha$ and $\gamma$ positions to the quaternary nitrogen atom a reactive thioether group.

5. Process according to claim 1 wherein the said quaternary salt of a heterocyclic nitrogen compound is formed in situ by employing the corresponding heterocyclic nitrogen base and an alkyl salt and effecting the condensation to produce the dyestuff by fusing the three reagents together.

6. A dyestuff of the general formula:

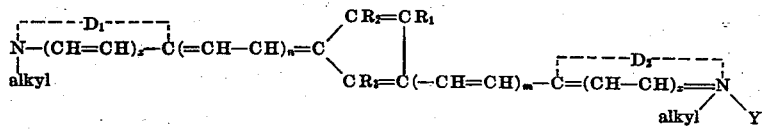

wherein Y is an acid radical, $R_1$ and $R_2$ are selected from the group consisting of hydrogen atoms, the hydrocarbon groups and the atoms necessary to complete an arylene radical with $-C'=C'-$, $R_3$ is selected from the group consisting of hydrogen atoms and hydrocarbon groups, $x$ is selected from the group consisting of nought and 1, $n$ and $m$ are selected from the group consisting of nought and positive integers at least one of them being a positive integer and $D_1$ and $D_2$ constitute the atoms necessary to complete heterocyclic nitrogen compounds of the type used n cyanine dyes.

7. A dyestuff of the general formula:

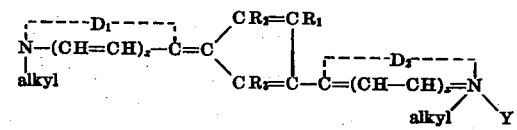

wherein Y is an acid radical, $R_1$ and $R_2$ are selected from the group consisting of hydrogen atoms, hydrocarbon groups and the atoms necessary to complete an arylene radical with $-C'=C'-$, $R_3$ is selected from the group consisting of hydrogen atoms and hydrocarbon groups, $x$ is selected from the group consisting of nought and 1 and $D_1$ and $D_2$ constitute the atoms necessary to complete different heterocyclic nitrogen compounds of the type used in cyanine dyes.

8. The process which comprises condensing 1-$\alpha$-N-methyldihydrobenzthiazolylidine ethylidene indene with 1-methylthiolbenzthiazole and an alkyl salt.

9. The process which comprises condensing 1-α-N-methyldihydrobenzthiazolylidine ethylidene indene with 1-methylthiolbenzthiazole and methyl-p-toluene sulphonate in the presence of an acid binding agent.

10. A dyestuff of the general formula:

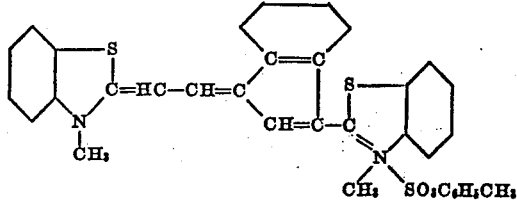

11. The process which comprises condensing 1 - α - (N - methyl - dihydrobenzthiazolylidene) - ethylidene indene with 1-α-acetanilidovinyl-benzoxazole methiodide in the presence of acetic anhydride.

12. A dyestuff of the general formula:

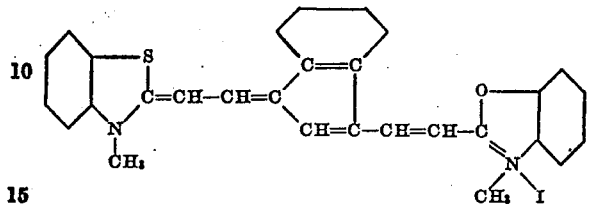

JOHN DAVID KENDALL.

CERTIFICATE OF CORRECTION.

Patent No. 2,265,909. December 9, 1941.

JOHN DAVID KENDALL.

It is hereby certified that error appears in the printed specification of the above numbered patent requiring correction as follows: Page 2, second column, line 8, for "methylthiobenzthiazole" read --methylthiolbenzthiazole--; and line 72, after "$\overset{\circ}{A}$." insert --with a maximum at about 7500 $\overset{\circ}{A}$.--; page 3, first column, line 17, for "drobenzthiazolylidene-ethylidene" read --drobenzthiazolylidene)-ethylidene--; line 40, for "out for" read --out from--; line 62, for "the" read --then--; page 4, second column, line 44, claim 6, strike out "the" first occurrence, and line 55, for "n" read --in--; and that the said Letters Patent should be read with this correction therein that the same may conform to the record of the case in the Patent Office.

Signed and sealed this 10th day of February, A. D. 1942.

(Seal)
Henry Van Arsdale,
Acting Commissioner of Patents.